US012153957B2

(12) United States Patent
Chajdas et al.

(10) Patent No.: US 12,153,957 B2
(45) Date of Patent: Nov. 26, 2024

(54) HIERARCHICAL WORK SCHEDULING

(71) Applicant: ADVANCED MICRO DEVICES, INC., Santa Clara, CA (US)

(72) Inventors: Matthaeus G. Chajdas, Munich (DE); Christopher J. Brennan, Boxborough, MA (US); Michael Mantor, Orlando, FL (US); Robert W. Martin, Acton, MA (US); Nicolai Haehnle, Munich (DE)

(73) Assignee: Advanced Micro Devices, Inc., Santa Clara, CA (US)

( * ) Notice: Subject to any disclaimer, the term of this patent is extended or adjusted under 35 U.S.C. 154(b) by 244 days.

(21) Appl. No.: 17/957,714

(22) Filed: Sep. 30, 2022

(65) Prior Publication Data

US 2024/0111578 A1 Apr. 4, 2024

(51) Int. Cl.
*G06F 9/48* (2006.01)
(52) U.S. Cl.
CPC .................. *G06F 9/4881* (2013.01)
(58) Field of Classification Search
None
See application file for complete search history.

(56) References Cited

U.S. PATENT DOCUMENTS

| 9,417,918 | B2 | 8/2016 | Chin et al. |
| 2001/0000194 | A1 | 4/2001 | Sequeira |
| 2013/0167152 | A1 | 6/2013 | Jeong |
| 2015/0016266 | A1* | 1/2015 | Dumitrescu ........ H04L 47/2441 370/236 |
| 2019/0294470 | A1 | 9/2019 | Minor et al. |

FOREIGN PATENT DOCUMENTS

CN 113434280 9/2021

OTHER PUBLICATIONS

International Search Report and Written Opinion issued in Application No. PCT/US2023/033937, mailed Jan. 25, 2024, 10 pages.

* cited by examiner

*Primary Examiner* — Scott C Sun (57) ABSTRACT

A method for hierarchical work scheduling includes consuming a work item at a first scheduling domain having a local scheduler circuit and one or more workgroup processing elements. Consuming the work item produces a set of new work items. Subsequently, the local scheduler circuit distributes at least one new work item of the set of new work items to be executed locally at the first scheduling domain. If the local scheduler circuit of the first scheduling domain determines that the set of new work items includes one or more work items that would overload the first scheduling domain with work if scheduled for local execution, those work items are distributed to the next higher-level scheduler circuit in a scheduling domain hierarchy for redistribution to one or more other scheduling domains.

21 Claims, 4 Drawing Sheets

HIERARCHICAL WORK SCHEDULING

BACKGROUND

Graphics processing applications often include work streams of vertices and texture information and instructions to process such information. The various items of work (also referred to as "commands") may be prioritized according to some order and enqueued in a system memory buffer to be subsequently retrieved and processed. Scheduler circuits receive instructions to be executed and generate one or more commands to be scheduled and executed at, for example, processing resources of a graphics processing unit (GPU) or other single instruction-multiple data (SIMD) processing unit.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

The performance of GPU architectures and other parallel-processing architectures continues to increase as applications perform large numbers of operations involving many iterations (or timesteps) and multiple operations within each step. To avoid overhead and performance degradation that would result from launching these operations to the GPU separately, multiple work items (often referred to collectively as "graphs" or "work graphs") are launched via a single CPU operation rather than via separate CPU operations. Graph-based software architectures, often referred to as dataflow architectures, are common to software applications that process continual streams of data or events. However, centralized scheduling systems such as command processors can incur significant memory overhead, execution overhead, and does not scale across multiple engines.

To address these problems and to enable improved scheduling of complex graphs (especially with multi-chiplet GPU architectures or, more generally, multi-chiplet single instruction-multiple data (SIMD) processor architectures), FIGS. 1-4 describe systems and methods for hierarchical work scheduling that includes scheduler circuits executing graphs locally. In implementations, a method of hierarchical work scheduling includes consuming a first work item at a first scheduling domain having a local scheduler circuit and one or more workgroup processing elements. The first scheduling domain consuming the first work item produces a set of new work items. Subsequently, the local scheduler circuit distributes at least one new work item of the set of new work items to be executed locally at the first scheduling domain. However, if the local scheduler circuit of the first scheduling domain determines that the set of new work items includes one or more work items that would overload the first scheduling domain with work if scheduled for local execution, those work items are returned to the next higher-level scheduler circuit in a scheduling domain hierarchy for redistribution. Similarly, if a scheduling domain runs out of work, it can request new work from the next scheduler circuit in the hierarchy. In such circumstances, the scheduler circuit requests any scheduling domain below to make work available for the first scheduling domain. In this manner, the scheduling capacity of complex graphs scales with chip size while keeping data movement minimal. Further, cross-domain bandwidth is reduced, which is becoming increasingly important as off-chip memory latency and power usage increases.

Note that while reference is made to graphics processing and GPUs below, these references are for illustrative purposes and are not intended to limit the following description. Rather, the systems and techniques described herein may be implemented for various forms of parallel processing of work items besides, or in addition to, graphics-related work items. As such, reference to graphics work scheduling and graphics work items applies equally to other types of work scheduling and work items, and, similarly, reference to GPU applies equally to other types of SIMD processing units or other parallel-processing hardware accelerators, such as accelerated processing units (APUs), discrete GPUs (dGPUs), artificial intelligence (AI) accelerators, and the like.

Figure 1:
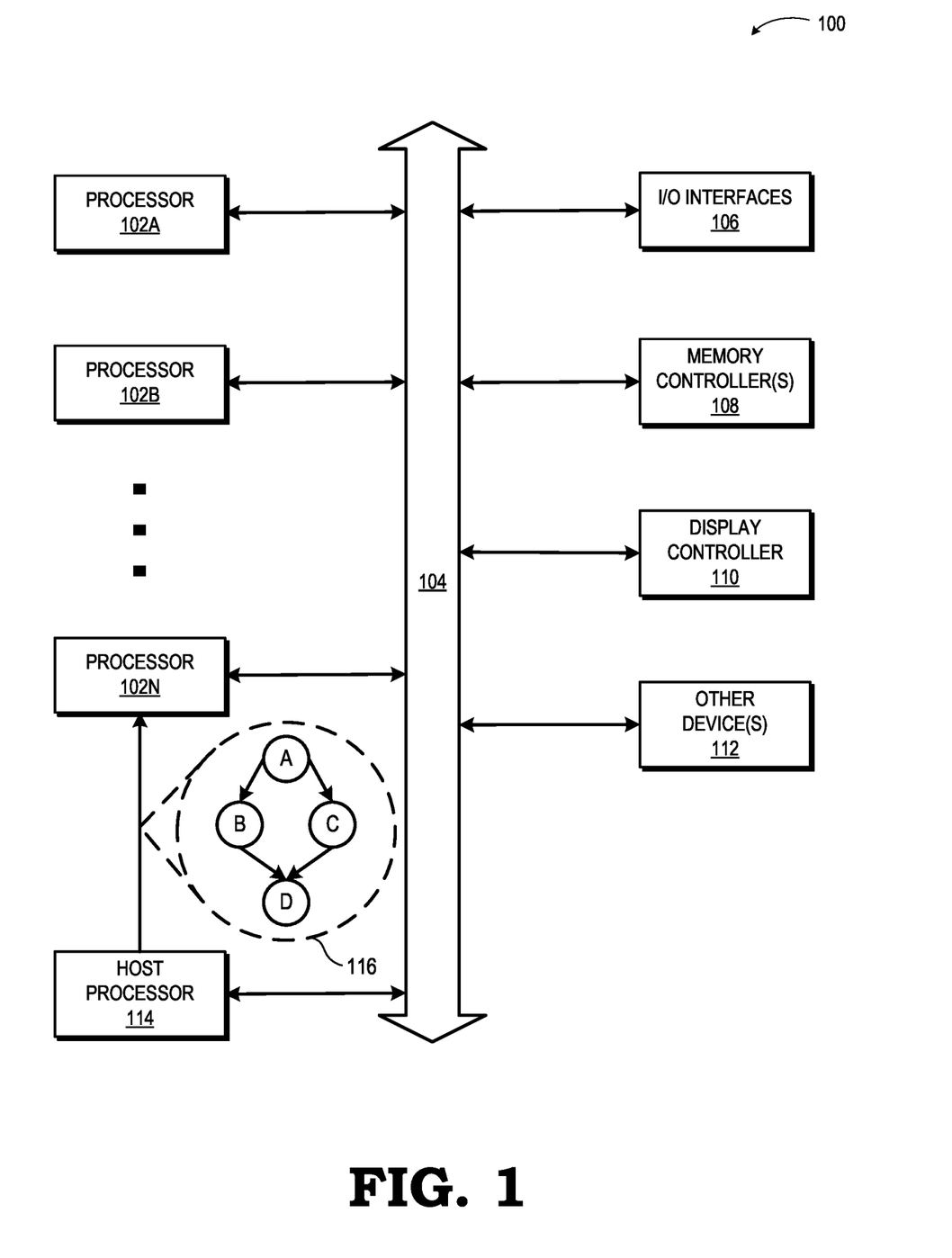
FIG. 1 illustrates a block diagram of a computing system implementing hierarchical work scheduling in accordance with implementations.

FIG. 1 illustrates a block diagram of a computing system 100 employing hierarchical work scheduling in accordance with implementations. In implementations, the computing system 100 includes at least one or more processors 102A-N, fabric 104, input/output (I/O) interfaces 106, memory controller(s) 108, display controller 110, and other device(s) 112. In implementations, to support execution of instructions for graphics and other types of workloads, the computing system 100 also includes a host processor 114, such as a central processing unit (CPU). In implementations, computing system 100 includes a computer, laptop, mobile device, server, or any of various other types of computing systems or devices. It is noted that the number of components of computing system 100 may vary. It is also noted that in implementations computing system 100 includes other components not shown in FIG. 1. Additionally computing system 100 can be structured in other ways than shown in FIG. 1.

Fabric 104 is representative of any communication interconnect that complies with any of various types of protocols utilized for communicating among the components of the computing system 100. Fabric 104 provides the data paths, switches, routers, and other logic that connect the processors 102, I/O interfaces 106, memory controller(s) 108, display controller 110, and other device(s) 112 to each other. Fabric 104 handles the request, response, and data traffic, as well as probe traffic to facilitate coherency. Fabric 104 also handles interrupt request routing and configuration access paths to the various components of computing system 100. Additionally, fabric 104 handles configuration requests, responses, and configuration data traffic. In implementations, fabric 104 is bus-based, including shared bus configurations, crossbar configurations, and hierarchical buses with bridges. In other implementations, fabric 104 is packet-based, and hierarchical with bridges, crossbar, point-to-point, or other interconnects. From the point of view of fabric 104, the other components of computing system 100 are referred to as "clients". Fabric 104 is configured to process requests generated by various clients and pass the requests on to other clients.

Memory controller(s) 108 are representative of any number and type of memory controllers coupled to any number and type of memory device(s). For example, the type of memory device(s) coupled to memory controller(s) 108 include Dynamic Random Access Memory (DRAM), Static Random Access Memory (SRAM), NAND Flash memory, NOR flash memory, Ferroelectric Random Access Memory (FeRAM), or others. Memory controller(s) 108 are accessible by processors 102, I/O interfaces 106, display controller 110, and other device(s) 112 via fabric 104. I/O interfaces 106 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices are coupled to I/O interfaces 106. Such peripheral devices include (but are not limited to) displays, keyboards, mice, printers, scanners, joysticks or other types of game controllers, media recording devices, external storage devices, network interface cards, and so forth. Other device(s) 112 are representative of any number and type of devices (e.g., multimedia device, video codec).

In implementations, each of the processors 102 is a parallel processor (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). In implementations, each parallel processor 102 is constructed as a multi-chip module (e.g., a semiconductor die package) including two or more base integrated circuit dies communicably coupled together with bridge chip(s) or other coupling circuits or connectors such that a parallel processor is usable (e.g., addressable) like a single semiconductor integrated circuit. As used in this disclosure, the terms "die" and "chip" are interchangeably used. Those skilled in the art will recognize that a conventional (e.g., not multi-chip) semiconductor integrated circuit is manufactured as a wafer or as a die (e.g., single-chip IC) formed in a wafer and later separated from the wafer (e.g., when the wafer is diced); multiple ICs are often manufactured in a wafer simultaneously. The ICs and possibly discrete circuits and possibly other components (such as non-semiconductor packaging substrates including printed circuit boards, interposers, and possibly others) are assembled in a multi-die parallel processor.

In implementations, each of the individual processors 102 include one or more base IC dies employing processing chiplets in accordance with implementations. The base dies are formed as a single semiconductor chip including N number of communicably coupled graphics processing stacked die chiplets. In implementations, the base IC dies include two or more direct memory access (DMA) engines that coordinate DMA transfers of data between devices and memory (or between different locations in memory).

As will be appreciated by those skilled in the art, parallel processors and other multithreaded processors 102 implement, in implementations, multiple processing elements (not shown) (also interchangeably referred to as processor cores or compute units) that that are configured to execute concurrently or in parallel multiple instances (threads or waves) of a single program on multiple data sets. Several waves are created (or spawned) and then dispatched to each processing element in a multi-threaded processor. In implementations, a processing unit includes hundreds of processing elements so that thousands of waves are concurrently executing programs in the processor. The processing elements in a GPU typically process three-dimensional (3-D) graphics using a graphics pipeline formed of a sequence of programmable shaders and fixed-function hardware blocks.

The host processor 114 prepares and distributes one or more operations to the one or more processors 102A-N (or other computing resources), and then retrieves results of one or more operations from the one or more processors 102A-N. Conventionally, the host processor 114 sends work to be performed by the one or more processors 102A-N by queuing various work items (also referred to as "threads") in a command buffer (not shown). Computer applications such as graphics processing applications perform a large number of operations (e.g., kernel launches or memory copies) involving many iterations (or timesteps) and multiple work items within each step. In implementations, the computing system 100 utilizes a graph-based model for submitting work to be performed by the one or more processors 102A-N (or other parallel computing architecture) as an integrated whole by using work graphs rather than single GPU operations.

In at least one implementation, the host processor 114 executes one or more work graphs. In particular, a workload including multiple work items is organized as a work graph (or simply "graph"), where each node in the graph represents a corresponding work item to be performed and each edge (or link) between two nodes corresponds to a dependency (such as a data dependency, an execution dependency, or some other dependency) between the two work items represented by the two linked nodes. To illustrate, work graph 116 includes work items forming the nodes (A-D of the work graph 116, with the edges being the dependencies between work items. In one implementation, a dependency indicates when the work items of one node have to complete before the work items of another node can begin. In implementations, a dependency indicates when one node needs to wait for data from another node before it can begin and/or continue its work items. In implementations, one or more processors 102A-N execute the work graph 116 after invocation by the host processor 114 by executing work items starting at node A. As shown, the edges between node A and nodes B and C (as indicated by the arrows) indicates that work items of node A have to complete executing before work items of nodes B and C can begin. In implementations, the nodes of work graph 116 include work items such as kernel launches, memory copies, CPU function calls, or other work graphs (e.g., each of nodes A-D may correspond to a sub-graph [not shown] including two or more other nodes).

As described in more detail with respect to FIGS. 2-4 below, a computing system implements a scalable scheduling mechanism that can scale to arbitrarily large GPU configurations (across chiplets and packages), has minimal bandwidth requirements, and can reach near-optimal memory usage. This scheduling mechanism includes parallel, scalable scheduler circuits subdividing the system into multiple scheduling domains and which can also schedule concurrently across multiple scheduling domains as well as inside scheduling domains. The scheduling mechanism further includes memory/control hardware attached to each scheduling domain. Each scheduling domain includes its own scheduler circuit and can create work for itself by consuming work items in the nodes of a corresponding work graph while keeping much of the memory traffic local. In implementations, each scheduling domain communicates only with its parent scheduler circuit (e.g., one level up in the scheduling domain hierarchy) but does not communicate horizontally with other scheduler circuits within the same hierarchy level to avoid N-squared communication patterns.

Figure 2:
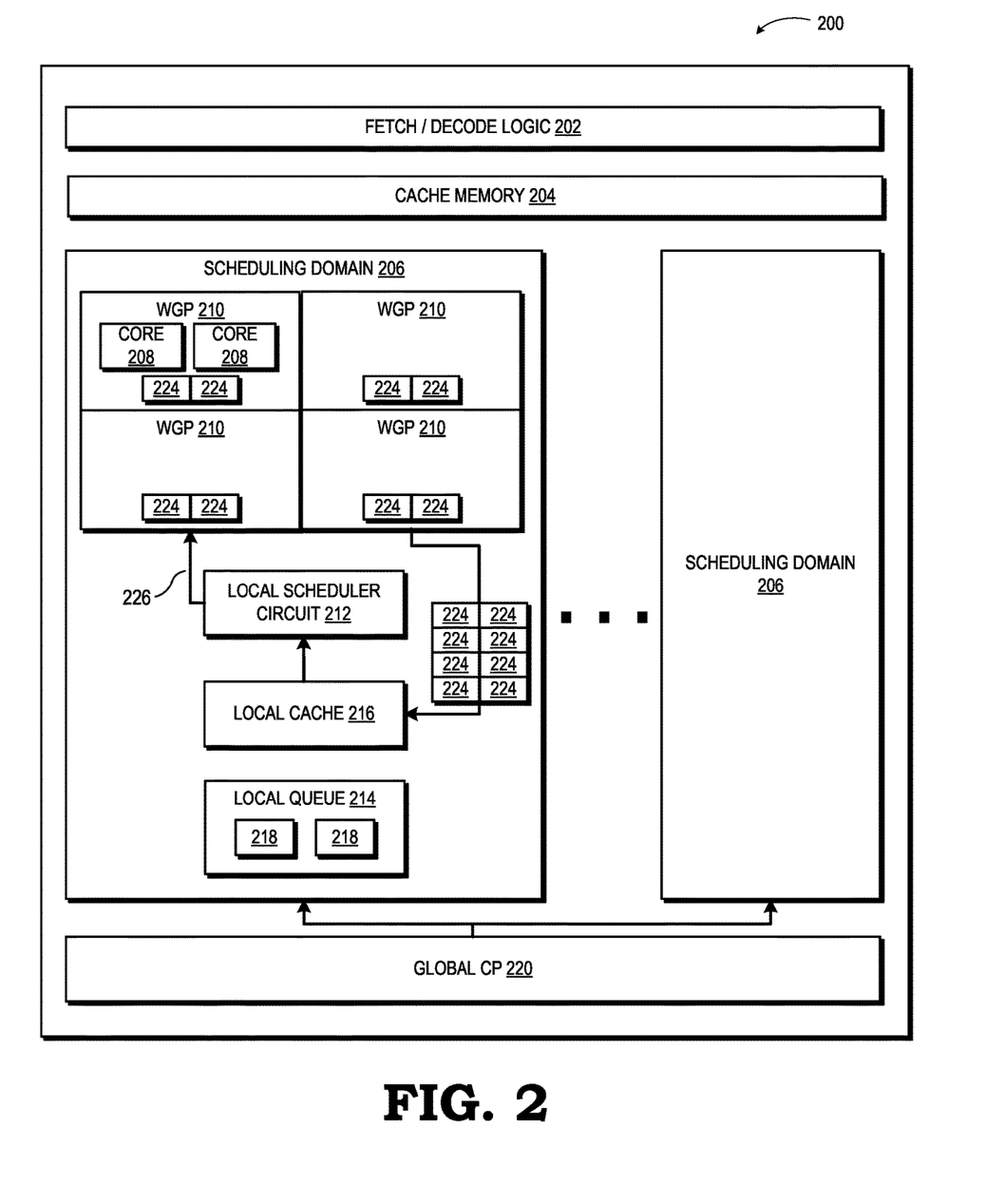
FIG. 2 is a block diagram of portions of a processor implementing hierarchical scheduler circuits in accordance with implementations.

Referring now to FIG. 2, illustrated is a block diagram of portions of a processor 200 implementing hierarchical scheduler circuits in accordance with implementations. In implementations, the processor 200 includes fetch/decode logic 202 that fetches and decodes instructions in the waves of the workgroups that are scheduled for execution by the processor 200. Implementations of the processor 200 execute waves in a workgroup. For example, in implementations, the fetch/decode logic 202 fetches kernels of instructions that are executed by all the waves in the workgroup. The fetch/decode logic 202 then decodes the instructions in the kernel. The processor 200 also includes a cache memory 204 such as a level 1 (L1) cache that is used to store local copies of data and instructions that are used during execution of the waves.

In implementations, the processor 200 is used to implement a processor 102 as shown in FIG. 1. As will be appreciated, in implementations, each processor 102 includes multiple processing elements that operate according to SIMD protocols to concurrently execute the same instruction on multiple data sets using multiple processor cores. The smallest processing elements are therefore referred to as SIMD units. In implementations, the SIMD units are partitioned into processor cores 208, which collectively form a workgroup processing element 210.

In implementations, the processor 200 includes one or more scheduling domains 206 (also referred to sometimes as a "node processor" due to its processing of work items in the nodes of a work graph, such as work graph 116 as previously described) including a local scheduler circuit 212 (also interchangeably referred to as a workgraph scheduler circuit [WGS]) associated with a set of workgroup processing elements 210. The various scheduler circuits and command processors described herein handle queue-level allocations. As shown in FIG. 2, the example implementation of processor 200 includes N=2 number of scheduling domains 206. Each scheduling domain 206 includes, in implementations, a plurality of workgroup processing elements 210, the local scheduler circuit 212, a local queue 214, and a local cache 216. During execution of work, the local scheduler circuit 212 executes work locally and does not interact with other scheduling domains. Instead, the local scheduler circuit 212 uses a private memory region for scheduling and as scratch space.

Although illustrated as including two scheduling domains 206, those skilled in the art will recognize that any number of scheduling domains across any number of domain hierarchies may be included at the processor 200. Further, those skilled in the art will recognize that the processor 200, in implementations, includes any number of nested scheduling domains. For example, such as described below with respect to FIG. 3, higher-level scheduling domains are typically a less granular hierarchy relative to scheduling domain 206 (e.g., includes multiple scheduling domains 206). In other implementations, lower-level scheduling domains are typically a more granular hierarchy (e.g., each workgroup processing element 210 of FIG. 2 is its own lower-level scheduling domain and includes its own local scheduler circuit). Nested scheduling domains include any number and combination of these various hierarchical scheduling domains.

In implementations, the workgroup processing elements 210 enqueuing work items are appended to a single local queue 214 (or a small set of local queues) that signals when the queue has a sufficient number of work items pending. For allocation efficiency, the queue memory is managed into chunks 218 (including empty chunks, chunks in enqueue state, chunks in use, and the like). As used herein, "chunks", such as chunks 218, are blocks of memory (such as in cache memory) and are used to group work items together to avoid dealing with individual work items at the scheduling level. In implementations, one chunk 218 includes multiple work items, with each work item potentially targeted at a different node in the work graph. In this way, the local scheduler circuit 212 is able to provide for local execution (e.g., minimal bandwidth usage) of work with reduced memory access and usage. In implementations, the queues described herein (e.g., local queue) allows for appending and/or removing of work items. Such queues are implemented, in implementations, as ring-buffers and can be full.

In implementations, the processor 200 also includes a global command processor (CP) 220 (also interchangeably referred to as the 'global scheduler circuit' or 'central CP') that is a higher-level scheduler circuit to scheduling domains 206 and communicates with all of them. In implementations, when there are work items that needs to be distributed for execution, the global CP 220 distributes (e.g., evenly) work items across the two or more scheduling domains 206 for execution at their respective workgroup processing elements 210. However, execution of work items often continues to produce additional new items of work ("new work items"). In implementations, new work items 224 are produced by workers at the lowest level scheduling domain of a scheduling domain hierarchy. The lowest level in the scheduling domain hierarchy contains the hardware (e.g., workgroup processing elements 210 of FIG. 2) which consumes and produces new work items as a result of the consumption, and those new work items are sent up/down through the scheduling domain hierarchy if a local scheduling domain is overflowing or running empty with work items. For example, eight new work items 224 are produced by the workgroup processing element 210 as the result of previous execution of work items. The new work items 224 are initially stored at the local cache 216.

Conventionally, such new work items 224 are passed out of the local cache memory (e.g., local cache 216) of a scheduling domain 206 to cache memory 204 for the global CP 220 to distribute in the next scheduling round. As will be appreciated by those skilled in the art, such a scheduling scheme results in work items being inefficiently moved around if work needs to be sent to the global CP 220 for scheduling and distribution. This is additionally inefficient as work produced at a particular scheduling domain 206 cannot be consumed immediately locally but instead needs to be passed to the global CP 220 for rescheduling. To improve scheduling of work items, this disclosure describes rescheduling mechanisms scheduler circuits subdividing the system into multiple scheduling domains and which can also schedule concurrently across multiple scheduling domains as well as inside scheduling domains. Although described with respect to FIG. 2 in the context of scheduling domains 206 within a processor 200, those skilled in the art will recognize that the concepts described are not limited to the illustrated two-level scheduling domain hierarchy of FIG. 2 in which a top level the scheduling domain hierarchy, global scheduling domain includes the global CP 220 and the lower level of the scheduling domain hierarchy includes each individual scheduling domain 206 and their respective workgroup processing elements 210. In implementations, scheduling domain hierarchies may be expanded in scope to include, for example, a further lower level within the scheduling domain hierarchy (e.g., a scheduling domain within each individual workgroup processing element 210) and/or a further top level within the scheduling domain hierarchy (e.g., a parent scheduling domain per package in a multi-GPU system containing multiple processors 200).

Utilizing the local scheduler circuits 212 of each scheduling domain 206 for distributing work to locally available workgroup processing elements 210 as described herein typically leads to reducing the amount of memory traffic, latency associated with transfer of data to cache memory 204, and also waiting for workgroup processing elements 210 to finish before redistributing new work items. In implementations, each scheduling domain 206 only communicates with the global CP 220, such as via local scheduler circuit 212, when it is out of work or has too much work that it needs to offload some for other scheduling domains. As illustrated in FIG. 2, the local scheduler circuit 212 distributes the eight new work items 224 by scheduling the new work items 224 for execution at workgroup processing elements 210 of the same scheduling domain 206 from which the original work items were produced (e.g., FIG. 2 showing the eight new work items 224 generated by the scheduling domain 206 being redistributed equally among the four workgroup processing elements 210).

In this manner, the scheduling of work by the local scheduler circuit 212 (instead of transmitting work items to the global CP 220) from local cache 216 reduces the amount of back-and-forth traffic to cache memory 204. Latency is also reduced due to the communication path 226 between the local scheduler circuit 212 and the local workgroup processing elements 210 within each scheduling domain 206 (as opposed to the longer communication pathway (not shown) from a scheduling domain 206 out to cache memory 204 and then back to the workgroup processing elements for execution of work items).

In implementations, each scheduling domain 206 maintains local queues (e.g., local queue 214) that are only visible internally (that is, to the components of that same scheduling domain 206) and shared queues (not shown) that are shared with other scheduling domains 206. Work flows in both directions such that a scheduling domain 206 is able to take work from a shared queue to place in its own local queue 214 or may migrate local work from the local queue 214 to the shared queue. In implementations, there is always only one shared queue one level above visible to the scheduling domain 206—if the hierarchy is deeper, the scheduling domain 206 cannot skip levels but another scheduling domain of a higher hierarchy level needs to help. Shared queues differ in that a scheduling domain 206 knows that it needs synchronized access to them. That means all operations to a shared queue require synchronized access, for example via atomics, to allow other scheduling domains to access them concurrently. On the other hand, local queues are safe to access without synchronization if other scheduling domains need to request access for work stealing.

This architecture and method of distributing work without needing to communicate with a centralized instance (e.g., the global CP 220) allows for the system to self-balance and reduces the amount of resource overloading as well as underutilization. For example, in implementations, the local scheduler circuit 212 only communicates with the global CP 220 when its associated scheduling domain 206 is overloaded and/or does not have sufficient work to keep busy (as opposed to the conventional method of communicating with the global CP 220 each time a unit of work is finished). Instead, as described herein, the responsibility and computational overhead for work scheduling is distributed across multiple scheduler circuits of different hierarchy levels to get the benefits of memory locality and reduced latency.

Figure 3:
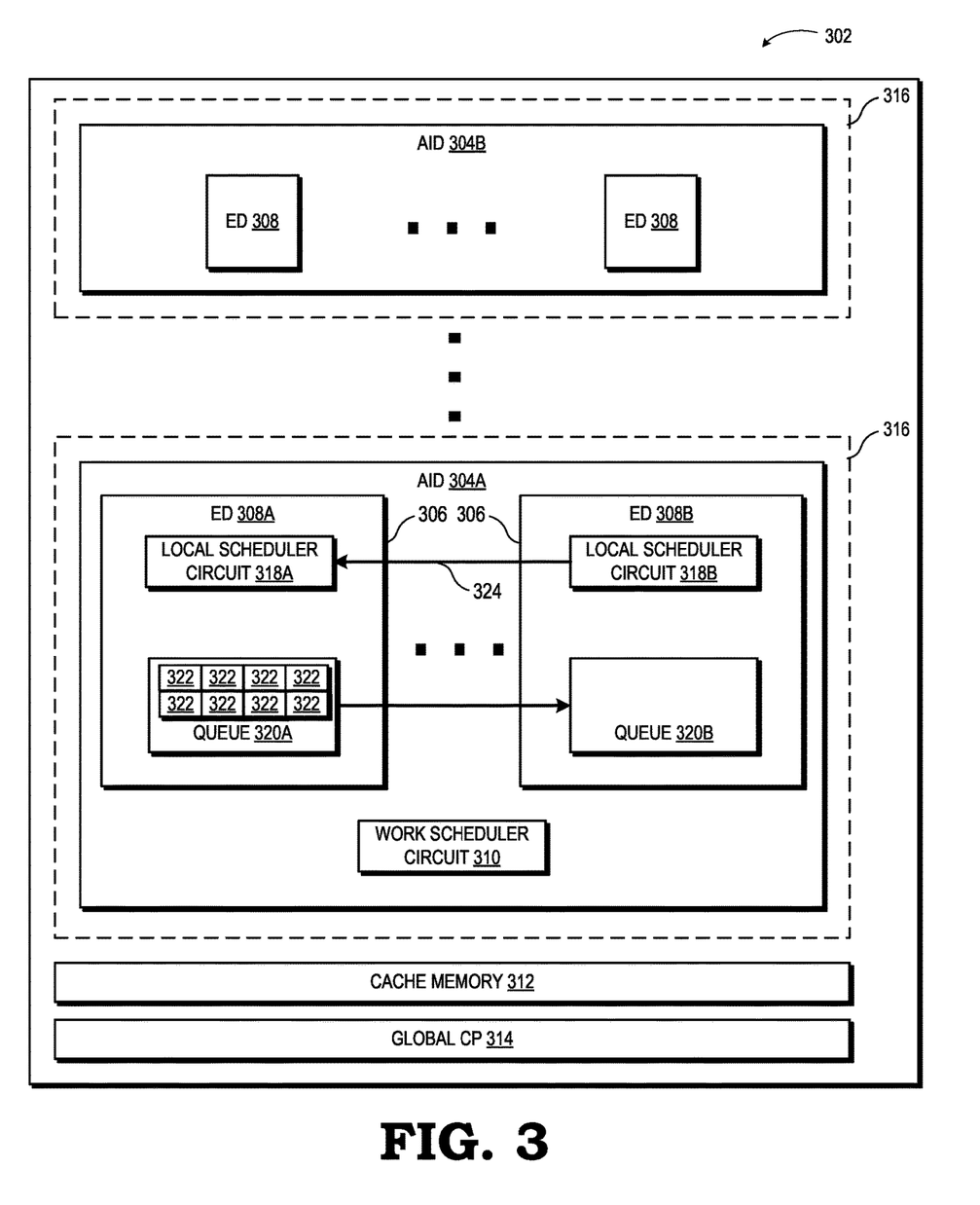
FIG. 3 is a block diagram illustrating a graphics processing stacked die chiplet implementing hierarchical scheduler circuits in accordance with implementations.

Referring now to FIG. 3, illustrated is an example of the hierarchical work scheduling technique in a system implemented as a graphics processing stacked die chiplet in accordance with implementations. As shown, a graphics processing stacked die chiplet 302 includes one or more base active interposer die (AID) 304 (indicated as AID 304A and AID 304B individually and collectively referred to as AIDs 304). It should be recognized that although the graphics processing stacked die chiplet 302 is described below in the particular context of GPU terminology for ease of illustration and description, in implementations, the architecture described is applicable to any of a variety of types of parallel processors without departing from the scope of this disclosure. In implementations, the graphics processing stacked die chiplet 302 functions, for example, as a multi-chip module. Additionally, in implementations, and as used herein, the term "chiplet" refers to any device including, but is not limited to, the following characteristics: 1) a chiplet includes an active silicon die containing at least a portion of the computational logic used to solve a problem (i.e., the computational workload is distributed across multiples of these active silicon dies); 2) chiplets are packaged together as a monolithic unit on the same substrate; and 3) the programming model preserves the concept that the combination of these separate computational dies as a single monolithic unit (i.e., each chiplet is not exposed as a separate device to an application that uses the chiplets for processing computational workloads).

The base active interposer die 304 of the graphics processing stacked die chiplet 302 includes N number of scheduling domains 306 (similar to the scheduling domain 206 of FIG. 2), where N=2 in the illustrated example. In implementations, each AID 304 includes one or more engine dies (ED) 308, such as shader engine dies or other compute dies or any appropriate parallel processing unit. In the implementation of FIG. 3, each discrete scheduling domain 306 includes a single ED 308. In other implementations (not shown), multiple EDs 308 may constitute a single scheduling domain 306. Although illustrated as including two scheduling domains 306, those skilled in the art will recognize that any number of scheduling domains across any number of domain hierarchies may be included at the AID 304. For example, in implementations, the AID 304 is a component of graphics processing stacked die chiplet 302 or other processor semiconductor package. The graphics processing stacked die chiplet 302 also includes a cache memory die 312 such as a last level cache and a global command processor (CP) die 314 (also interchangeably referred to as the 'global CP die' or 'global scheduler circuit'). As shown in FIG. 3, the graphics processing stacked die chiplet 302 is formed as a single semiconductor chip package including a first AID 304A and a second AID 304B that are two different scheduling domains 316 distinct from each other. As will be appreciated, each scheduling domain 316 is a higher-level scheduling domain (relative to scheduling domain 306) that includes one or more of the lower-level scheduling domains 306.

As will be appreciated by those skilled in the art, the global CP die 314 acts as the top-level scheduler circuit in the scheduling domain and communicates with all of them. However, this limits the scalability of current parallel processor architectures as systems rely on the uni-directional communication pattern of a global CP to send data to each scheduling domain for work to be executed. As described in more detail with respect to the implementations herein, the processor 200 and graphics processing stacked die chiplet 302 include both the global CP die 314 and one or more local scheduler circuits (e.g., local scheduler circuits 212 of FIG. 2 and local scheduler circuit 318 of FIG. 3). For example, in implementations, each scheduling domain 316 also includes a work scheduler circuit 310 that is local to each AID 304.

In the example implementation shown in FIG. 3, the first AID 304A includes a scheduler circuit 318A and a work queue 320A that is local to the first AID 304A and also work scheduler circuit 310 that is one level higher up in the scheduling domain hierarchy (i.e., a 'parent scheduler circuit') than local scheduler circuits 318A and 318B (referred to collectively as local scheduler circuits 318) of the individual EDs 308 in a nested scheduling domain configuration. Although work scheduling was previously described in FIG. 2 in the context of scheduling produced items for local execution within scheduling domains, in implementations, the local scheduler circuits (e.g., local scheduler circuit 318A of ED 308A at the AID 304A) give up work to other scheduling domains within the same hierarchy (e.g., scheduling domain 306 of the ED 308B) or to a hierarchy one level up (e.g., scheduling domain 316 of AID 304A). The local scheduler circuits 318A and 318B are referred to collectively as local scheduler circuits.

In implementations, the local queue 320A of the first ED 308A includes a queue of work items to be processed. As illustrated in FIG. 3, the local queue 320A includes eight items of work 322 that is known to be of a quantity that would cause the scheduling domain 306 of the first ED 308A to be overloaded with work (e.g., based on a number of work items to be scheduled per available workgroup processing element). In other implementations, the first ED 308A determines the type(s) of work that are queued at the local queue 320A. For example, some work items have a low amplification factor (as determined, for example, when packaging work items into work graphs via one or more API or library function calls) such that consuming the one work item produces a singular new work item (e.g., linear 1-to-1 relationship) or a few additional work items (e.g., 1-to-2 or 1-to-3 relationship). A theoretical amplification factor is known from the work graph definition, but the actual amplification is determined at runtime. An application defines during graph definition time that consumption of one particular work item can spawn 1 to N number of new work items, and when the graph executes, it is instructed to stay within those bounds. Other work items have a large amplification factor and produce a large number of new work items when consumed. In such implementations, the first ED 308A preemptively returns work items back to the global CP die 314 for distribution to other scheduling domains to prevent itself from becoming overloaded with work.

In implementations, a scheduling domain can also steal away work from other scheduling domains when it is idle or underutilized. For example, the second ED 308B is idle and sends an underutilization notification 324 from local scheduler circuit 318B to other scheduler circuits within the same scheduling domain hierarchy (e.g., local scheduler circuit 318A of the first ED 308A) or to the next hierarchical higher-level scheduler in the system (e.g., work scheduler circuit 310 of the scheduling domain 316). Similarly, if no work is present at the queue 320A, an idle signal is sent by the to the work scheduler circuit 310 at scheduling domain 316 to the global CP die 314 with a request to "steal" work from another domain.

As illustrated in FIG. 3, the second ED 308B steals work directly away from the first ED 308A to be transferred to the local queue 320B (the local queues 320A and 320 B referred to collectively as local queues 320) of the second ED 308B. As will be appreciated, this direct communication path between local scheduler circuits 318 is not excessively complex when there are few scheduling domains per hierarchy level but grows exponentially as the number of scheduling domains increases. Accordingly, in other implementations, instead of directly stealing work, the second ED 308B communicates to the global CP die 314 (e.g., moving up-down between scheduling domain hierarchy levels instead of traversing horizontally to peer neighboring scheduling domains within the same hierarchy level) to request the global CP die 314 to find some work, such as by pinging other scheduling domains to return some work to the global queue at cache memory die 312. In implementations, a single work item is shared between many items, amortizing the cost of migrating the work item out of a scheduling domain into another (e.g., via a cache flush such that the input work items are visible and available to the new scheduling domain).

Figure 4:
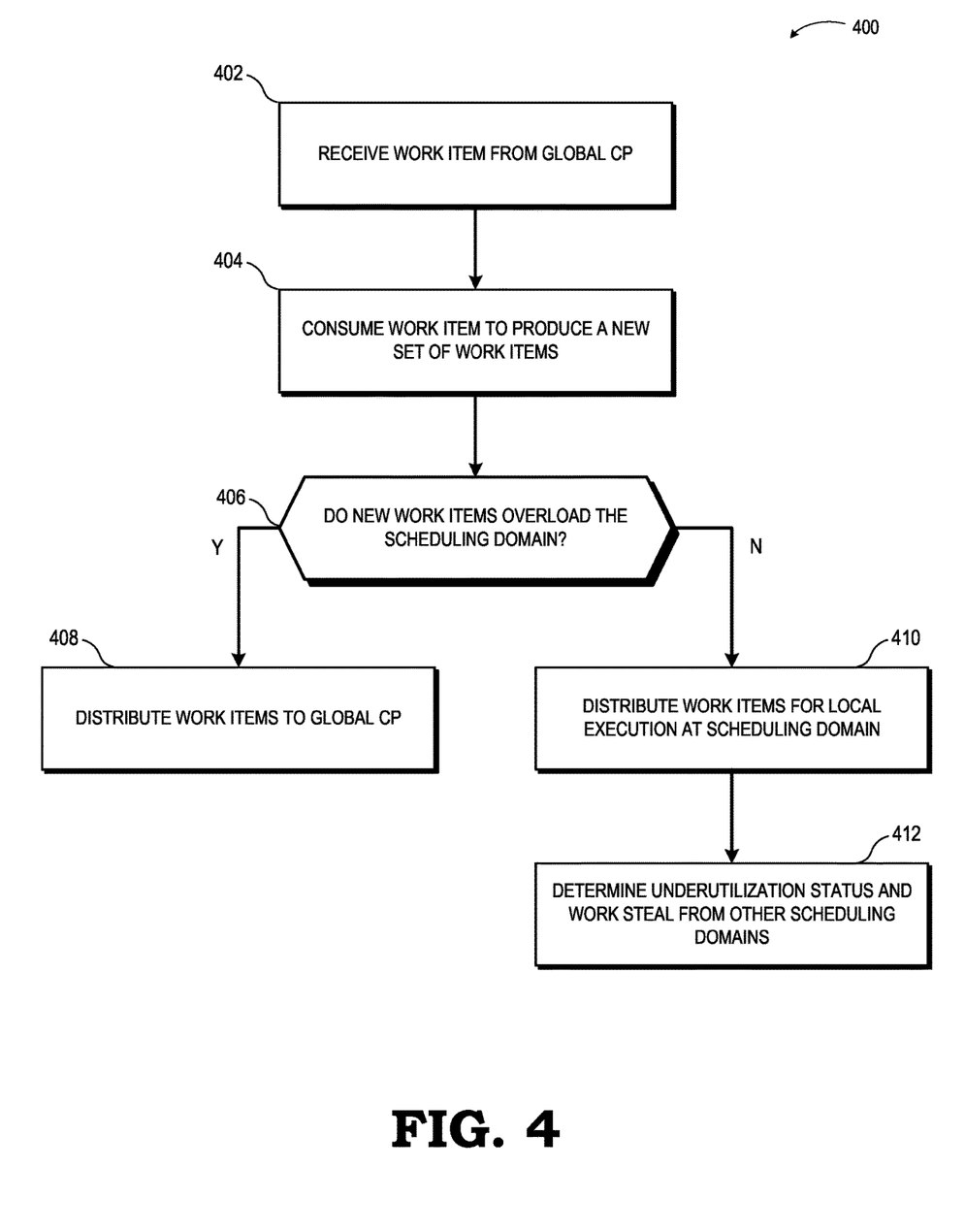
FIG. 4 is a block diagram of a method of performing hierarchical work scheduling in accordance with implementations.

Referring now to FIG. 4, illustrated is a block diagram of a method 400 of performing hierarchical work scheduling in accordance with implementations. For ease of illustration and description, the method 400 is described below with reference to and in an example context of the systems and devices of FIGS. 1-3. However, the method 400 is not limited to these example contexts, but instead in different implementations is employed for any of a variety of possible system configurations using the guidelines provided herein.

The method 400 begins at block 402 with a first scheduling domain receiving a first work item from a global command processor that is a higher-level scheduler circuit to the first scheduling domain. For example, such as previously described with respect to FIG. 2, when there are work items that needs to be distributed for execution, the global CP 220 distributes the work items (e.g., evenly) across the two or more scheduling domains 206. At block 404, the first scheduling domain (including a local scheduler circuit and one or more workgroup processing elements) consumes the first work item to produce a set of new work items. As previously described in more detail with respect to FIG. 2, work items, when consumed/executed, often continue to produce additional new items of work (e.g., new work items 224).

At block 406, the local scheduler circuit of the first scheduling domain determines whether the set of new work items includes one or more work items that would overload the first scheduling domain with work if scheduled for local execution. In implementations, determining that the set of new work items includes one or more work items that would overload the first scheduling domain includes determining a total number of the set of new work items exceeds a predetermined threshold. As illustrated in FIG. 3, the local queue 320A includes eight items of work that is known to be of a quantity that would cause the scheduling domain 306 of the first ED 308A to be overloaded with work (e.g., based on a number of work items to be scheduled per available workgroup processing element).

In other implementations, determining the set of new work items includes one or more work items that would overload the first scheduling domain includes identifying one or more work items having an amplification factor greater than a predetermined threshold. Some work items have a low amplification factor such that consuming the one work item produces a singular new work item (e.g., linear 1-to-1 relationship) or a few additional work items (e.g., 1-to-2 or 1-to-3 relationship). Other work items have a large amplification factor and produce a large number of new work items when consumed, distributing, by the local scheduler circuit, at least one set of new work items to be executed at the first scheduling domain.

If the local scheduler circuit determines that the one or more work items within the set of new work items would indeed overload the first scheduling domain, then the method 400 proceeds to block 408 with those identified work items being distributed by the local scheduler circuit to the next higher-level scheduler circuit in the hierarchy (e.g., the global command processor) for re-scheduling. For example, as discussed with respect to FIG. 3, in implementations the first ED 308A preemptively returns work items back to the global CP die 314 for distribution to prevent itself from becoming overloaded with work. However, if the local scheduler circuit determines that it is currently capable of executing the set of new work items, then the local scheduler circuit distributes work locally to the workgroup processing elements at block 410. As illustrated in FIG. 2, the local scheduler circuit 212 distributes the new work items 224 by scheduling the work items for execution at workgroup processing elements 210 of the same scheduling domain 206 from which the work items were produced (as indicated by the * notations). In this manner, the scheduling of work by the local scheduler circuit 212 (instead of transmitting work items to the global CP 220) from local cache 216 reduces the amount of back-and-forth traffic to cache memory 204.

Although described above in the context of moving work items to the next higher-level scheduling domain in response to overloading of local scheduler circuits, those skilled in the art will recognize that the operations of block 408 is also triggerable by other conditions. In implementations, work items may also be returned to a next higher-level scheduler circuit in the scheduling hierarchy when there is not sufficient work for efficient SIMD unit execution. For example, if there is a set of work items generated from a workgroup processing element 210 that consists of a large amount of work for program A and only a little bit of program B such that a workgroup processing element 210 is not fully utilized, then for the case where program B is a very long running program to make migrating work worthwhile, the local scheduler circuit would push off the work for program B to the next higher scheduling domain. At the next higher-level scheduling domain, the work for program B is combined with other work items for program B to form a larger set of work for program B to be sent back down to one of the lower scheduling domains for execution.

Additionally, in implementations, the local scheduler circuit also determines at block 412 whether one or more workgroup processing elements of its scheduling domain are underutilized and additional work should be requested for the next scheduling round. In implementations, the local scheduler circuit 212 communicates with the global CP 220 when its associated scheduling domain 206 does not have sufficient work to keep busy. The local scheduler circuit generates an underutilization signal requesting additional work items to be assigned to the first scheduling domain. In implementations, that underutilization signal is communicated to a second local scheduler circuit within a same level of a scheduling domain hierarchy. With respect to FIG. 3, the second ED 308B is idle and sends an underutilization notification 324 to other scheduler circuits within the same scheduling domain hierarchy (e.g., local scheduler circuit 318A of the first ED 308A) or from the next hierarchical higher-level scheduler circuit in the system (e.g., scheduler circuit 318A of the scheduling domain 316). As illustrated in FIG. 3, the second ED 308B steals work directly away from the first ED 308A. If no work is present at the queue 320A, an idle signal is sent to the next higher-level scheduling domain (which is global CP die 314 in this implementation) with a request to steal work from another domain.

In other implementations, the underutilization signal from the local scheduler circuit is communicated to a scheduler circuit at the next higher level of a scheduling domain hierarchy. For example, instead of directly stealing work, the second ED 308B communicates to the global CP die 314 (e.g., moving up-down between scheduling domain hierarchy levels instead of traversing horizontally to peer neighboring scheduling domains within the same hierarchy level) to request the global CP die 314 to find some work, such as by pinging other scheduling domains to return some work to the global queue at cache memory die 312.

Accordingly, as discussed herein, the hierarchical work scheduling by local scheduler circuits provides for increased data locality in which work items are consumed closer to the producer by implementing a parallel, scalable scheduler circuit which subdivides the system into (nested) scheduling domains. Each scheduling domain includes its own scheduler circuit and can create work for itself, while keeping the majority of the memory traffic local. This increases the efficiency of scheduling large, complex graphs (which contains nodes producing work and reductions) at minimal memory overhead (e.g., constant in the number of items that are concurrently processed and not the total amount of work). Further, by scheduling multiple domains concurrently and independently of each other, the number of cross-domain connections is decreased and cross-domain communication is limited. With this combined hardware/software approach, hierarchical work scheduling allows multiple levels of scheduling to be implemented from individual WGPs in a scheduling domain over chiplets to multi-GPU scheduling.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory) or coupled to the computer system via a wired or wireless network (e.g., network accessible storage (NAS)).

In implementations, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that may cause any benefit, advantage, or solution to occur or become more pronounced are not to be construed as a critical, required, or essential feature of any or all the claims. Moreover, the particular implementations disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular implementations disclosed above may be altered or modified and all such variations are considered within the scope of the disclosed subject matter. Accordingly, the protection sought herein is as set forth in the claims below.

What is claimed is:

1. A method for execution at a processor, comprising:
   scheduling, by a first scheduler circuit of the processor, a first work item for consumption by a first workgroup processing element associated with the first scheduler circuit;
   producing a set of new work items as a result of consumption of the first work item by the first workgroup processing element; and
   distributing, by the first scheduler circuit, at least one new work item of the set of new work items to a second scheduler circuit of the processor that is different from the first scheduler circuit.

2. The method of claim 1, wherein:
   the first scheduler circuit is part of a first scheduling domain of a scheduling hierarchy, the first scheduling domain including a set of workgroup processing elements that includes the first workgroup processing element; and
   the second scheduler circuit is part of a second scheduling domain of the scheduling hierarchy.

3. The method of claim 2, wherein the second scheduling domain is at a same level in the scheduling hierarchy as the first scheduling domain and includes a set of workgroup processing elements that is separate from the set of workgroup processing elements of the first scheduling domain.

4. The method of claim 2, wherein the second scheduling domain is at a higher level in the scheduling hierarchy than the first scheduling domain and includes a set of workgroup processing elements that includes the set of workgroup processing elements of the first scheduling domain and a set of workgroup processing elements of a third scheduling domain at lower level in the scheduling hierarchy than the second scheduling domain.

5. The method of claim 4, wherein the second scheduling domain is a global scheduling domain for the scheduling hierarchy and the second scheduler circuit is a global command processor.

6. The method of claim 5, further comprising:
   receiving the first work item at the first scheduler circuit from the global command processor.

7. The method of claim 2, wherein:
   distributing the at least one new work item is responsive to the first scheduler circuit determining that the set of new work items includes one or more work items that would overload the first scheduling domain if consumed by at least one workgroup processing element of the first scheduling domain.

8. The method of claim 7, wherein determining that the set of new work items includes one or more work items that would overload the first scheduling domain comprises identifying one or more work items having an amplification factor greater than a predetermined threshold.

9. The method of claim 7, wherein determining that the set of new work items includes one or more work items that would overload the first scheduling domain comprises determining a total number of new work items in the set of new work items exceeds a predetermined threshold.

10. The method of claim 2, further comprising:
    receiving the first work item at the first scheduler circuit responsive to an indication from the first scheduler circuit that one or more workgroup processing elements of the first scheduling domain are idle.

11. The method of claim 2, further comprising:
    distributing the at least one new work item to the second scheduler circuit responsive to an indication from the second scheduler circuit that one or more workgroup processing elements of the second scheduling domain are idle.

12. A system, comprising:
    a first processor comprising a first scheduling domain and a second scheduling domain, the first scheduling domain comprising a first scheduler circuit and a set of workgroup processing elements and the second scheduling domain comprising a second scheduler circuit separate from the first scheduling circuit; and
    the first scheduler circuit configured to:
       schedule a first work item for consumption by a workgroup processing element of the set; and
       distribute, to the second scheduler circuit, at least one new work item of a set of new work items generated by the workgroup processing element consuming the first work item.

13. The system of claim 12, wherein the first scheduling domain and the second scheduling domain are part of a scheduling hierarchy of the first processor.

14. The system of claim 13, wherein the second scheduling domain is at a same level in the scheduling hierarchy as the first scheduling domain and includes a set of workgroup processing elements that is separate from the set of workgroup processing elements of the first scheduling domain.

15. The system of claim 13, wherein the second scheduling domain is at a higher level in the scheduling hierarchy than the first scheduling domain and includes a set of workgroup processing elements that includes the set of workgroup processing elements of the first scheduling domain and a set of workgroup processing elements of a third scheduling domain at lower level in the scheduling hierarchy than the second scheduling domain.

16. The system of claim 15, wherein the second scheduling domain is a global scheduling domain for the scheduling hierarchy and the second scheduler circuit is a global command processor.

17. The system of claim 16, wherein the first scheduler circuit receives the first work item from the global command processor.

18. The system of claim 12, wherein the first scheduler circuit is configured to distribute the at least one new work item responsive determining that the set of new work items includes one or more work items that would overload the first scheduling domain if consumed by at least one workgroup processing element of the first scheduling domain.

19. The system of claim 18, wherein the first scheduler circuit is configured to determining that the set of new work items includes one or more work items that would overload the first scheduling domain if consumed by at least one workgroup processing element of the first scheduling domain responsive to at least one of: identifying one or more work items having an amplification factor greater than a predetermined threshold; or determining a total number of new work items in the set of new work items exceeds a predetermined threshold.

20. The system of claim 12, wherein the first scheduling domain comprises:
 a local queue accessible only by components in the first scheduling domain; and
 a shared queue accessible by both the first and second scheduling domains and configured to receive work from the local queue.

21. The system of claim 12, further comprising:
 a host processor coupled to the first processor and configured to issue a set of work items to the first processor as a work graph, the set of work items including the first work item.

* * * * *